(12) United States Patent
Samuel et al.

(10) Patent No.: US 10,776,492 B2
(45) Date of Patent: Sep. 15, 2020

(54) MULTI-STAGE FIRMWARE UPDATE METHOD AND SYSTEM THEREFOR

(71) Applicant: DELL PRODUCTS, LP, Round Rock, TX (US)

(72) Inventors: Balasingh Ponraj Samuel, Round Rock, TX (US); Anand P. Joshi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 120 days.

(21) Appl. No.: 16/126,616

(22) Filed: Sep. 10, 2018

(65) Prior Publication Data

US 2020/0082090 A1    Mar. 12, 2020

(51) Int. Cl.
*G06F 21/57*    (2013.01)
*G06F 21/64*    (2013.01)
*G06F 8/65*    (2018.01)

(52) U.S. Cl.
CPC .............. *G06F 21/575* (2013.01); *G06F 8/65* (2013.01); *G06F 21/64* (2013.01)

(58) Field of Classification Search
CPC ........... G06F 21/575; G06F 8/65; G06F 21/64
USPC ....................................................... 717/168
See application file for complete search history.

(56) References Cited

U.S. PATENT DOCUMENTS

| | | | |
|---|---|---|---|
| 6,622,302 B1 | 9/2003 | Delaney et al. | |
| 8,776,254 B1 * | 7/2014 | Mraz | H01L 63/123 713/150 |
| 10,185,551 B2 | 1/2019 | Kulkarni et al. | |
| 2002/0166062 A1 * | 11/2002 | Helbig, Sr. | G06F 21/554 726/22 |
| 2012/0110562 A1 * | 5/2012 | Heinrich | G06F 8/65 717/169 |
| 2014/0007067 A1 * | 1/2014 | Nelson | G06F 8/665 717/168 |
| 2016/0117165 A1 * | 4/2016 | Cavalaris | G06F 8/654 717/169 |
| 2016/0202964 A1 * | 7/2016 | Butcher | G06F 8/65 717/172 |
| 2016/0217283 A1 * | 7/2016 | Liu | G06F 21/566 |
| 2016/0239314 A1 * | 8/2016 | Suryanarayana | H04L 69/16 |
| 2017/0010875 A1 * | 1/2017 | Martinez | G06F 8/61 |
| 2017/0085383 A1 * | 3/2017 | Rao | G06F 3/0632 |
| 2017/0255567 A1 * | 9/2017 | Vidyadhara | G06F 12/1081 |
| 2017/0329593 A1 * | 11/2017 | McMullen | G06F 11/1433 |
| 2018/0004502 A1 * | 1/2018 | Samuel | G06F 8/71 |
| 2018/0004506 A1 * | 1/2018 | Annapureddy | G06F 8/654 |
| 2018/0239610 A1 * | 8/2018 | Grandin | G06F 9/4401 |

* cited by examiner

*Primary Examiner* — John Q Chavis
(74) *Attorney, Agent, or Firm* — Larson Newman, LLP

(57) ABSTRACT

A method includes receiving a firmware update package at an information handling system. The update package includes a payload containing a transition basic input-output system (BIOS) and another payload containing a new BIOS. The new BIOS is stored at an Extensible Firmware Interface system partition (ESP). A firmware image at a BIOS flash device at the information handling system is updated using the new BIOS retrieved from the ESP.

19 Claims, 4 Drawing Sheets

MULTI-STAGE FIRMWARE UPDATE METHOD AND SYSTEM THEREFOR

FIELD OF THE DISCLOSURE

This disclosure generally relates to information handling systems, and more particularly relates to a multi-stage firmware update method and system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include receiving a firmware update package at an information handling system. The update package includes a payload containing a transition basic input-output system (BIOS) and another payload containing a new BIOS. The new BIOS is stored at an Extensible Firmware Interface system partition (ESP). A firmware image at a BIOS flash device at the information handling system is updated using the new BIOS retrieved from the ESP.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
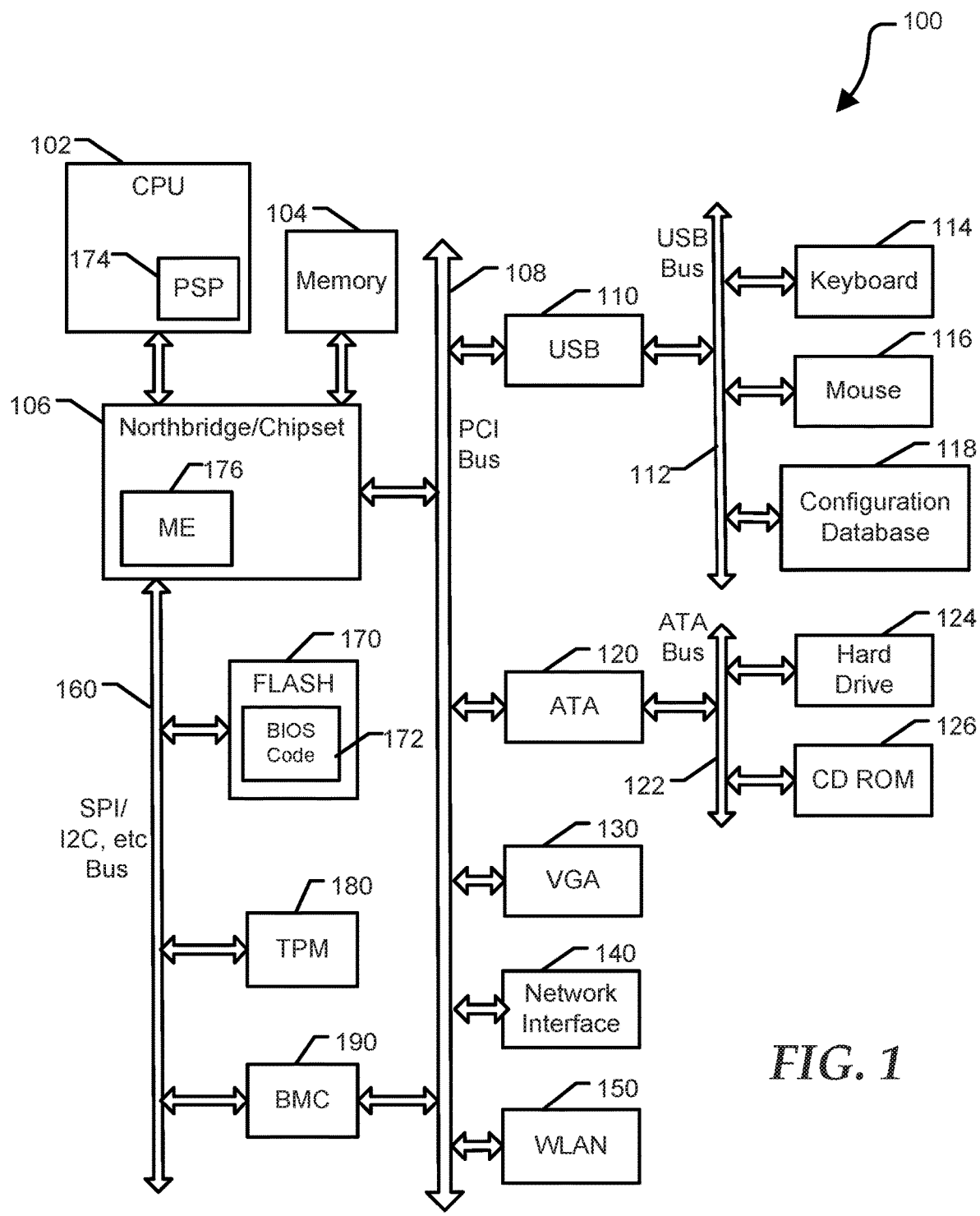
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a basic input/output system (BIOS) that is responsible for initializing hardware components and subsystems and to load an operating system during a startup process of the system. The BIOS is typically stored at a non-volatile memory device, for example a flash memory device. An information handling system is usually delivered to a customer with an initial version of the BIOS already installed at the flash memory device. During the lifetime of the information handling system, it may become necessary or advisable to update the BIOS with a new version having one or more firmware revisions. This procedure is often referred to as flashing the BIOS. During this process, the previous BIOS can be deleted, and the revised BIOS can be stored at the flash memory device.

On occasions, a new BIOS revision may be incompatible with one or more configuration aspects of the BIOS presently installed at the information handling system. For example, the new BIOS may require changes to a flash map that specifies which physical addresses at the flash memory device are associated with particular logical partitions of the BIOS. In this situation, a transition BIOS can first be installed and executed. During execution, the transition BIOS can correct the incompatibilities, and the new BIOS can subsequently be installed. Having to install a transition BIOS in addition to a new BIOS can be a burden to users, administrators, and to original equipment manufactures that maintain and provide the BIOS revisions. Furthermore, security of the information handling system may deprecated during the interval of time after installing the transition BIOS and before installing the new BIOS. For example, the system may be susceptible to malicious software attacks if an operating system is loaded after booting the transition BIOS. Techniques disclosed herein overcome these issues by combining the transition BIOS and the new BIOS in a single update package. The information handling system can process the update package, installing the transition BIOS and the new BIOS without requiring intermediate intervention by a user of the system. In addition, a platform security root-of-trust can be maintained throughout the sequential update process so that the system is not left vulnerable to malicious attacks during the update process.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a first flash memory device 170 for storing BIOS code 172, a trusted platform module (TPM) 180, and a baseboard management controller (BMC) 190. BMC 190 can be referred to as a service processor, and embedded controller, and the like. Flash memory device 170 can be referred to as a SPI flash device, BIOS SPI, and the like. BMC 190 is configured to provide out-of-band access to devices at information handling system 100. As used herein, out-of-band access herein refers to operations performed without support of CPU 102, such as prior to execution of BIOS code 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors, and can be included at chipset 106.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems.

The root of trust relates to software processes and/or hardware devices that ensure that firmware and other software necessary for operation of an information handling system is operating as expected. The important aspect for a root of trust is to be sure that the initial code is what the manufacturer intended, before the code is executed. When the information handling system starts, the root of trust can execute self-tests to validate the first piece of code in the chain of trust. At the present time, AMD utilizes a platform security processor (PSP) that is integrated on the central processing unit to provide an initial root of trust, while Intel provides this function using a management engine (ME) that is integrated on a chipset device. The PSP and the ME are both configured to validate initial firmware at a BIOS image, herein referred to as an initial boot block.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware image, and the term BIOS is herein used interchangeably with the term firmware image, or simply firmware. In an embodiment, BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 172 includes instructions executable by CPU 102, and either PSP 174 or ME 176, to initialize and test the hardware components of system 100, and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed.

Device drivers provide an interface through which other components of the system 100 can communicate with a corresponding device.

Figure 2:
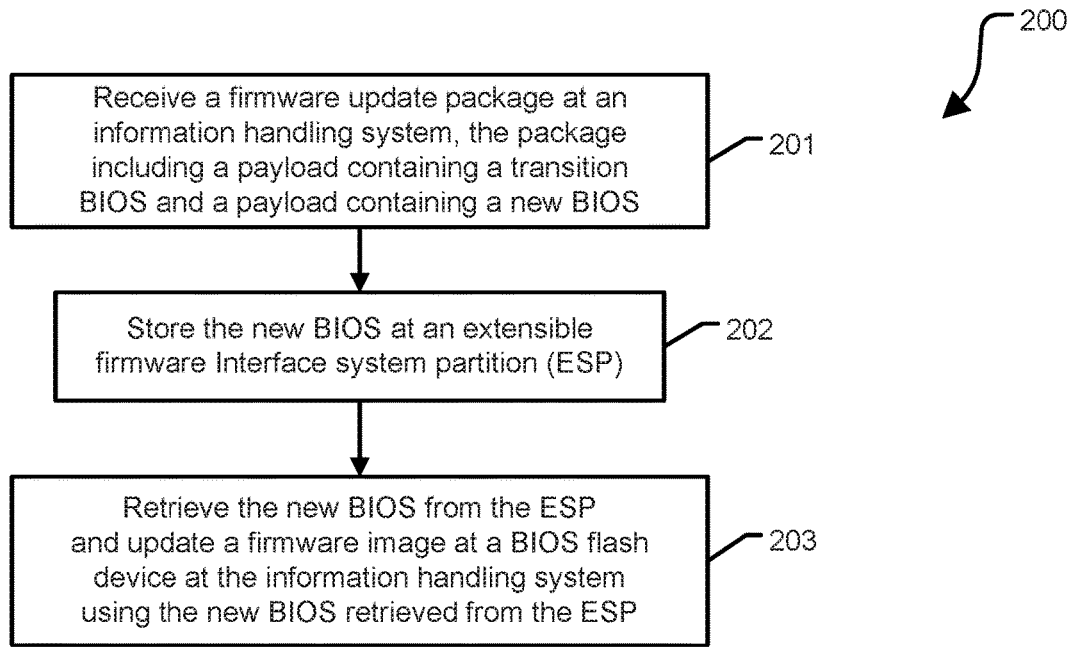
FIG. 2 is a flow diagram illustrating a method for updating a BIOS at an information handling system according to a specific embodiment of the present disclosure.

FIG. 2 shows a method 200 for updating a BIOS at an information handling system according to a specific embodiment of the present disclosure. Method 200 begins at block 201 where a firmware update package is received at an information handling system, the package including a payload containing a transition BIOS and a payload containing a new BIOS. For example, a Windows Update server or similar update administration service can host the firmware update package and facilitate dissemination of the update package to one or more information handling systems. Alternatively, a user of the information handling system may download the firmware update package from an original equipment provider or the like, and a BIOS update can be initiated when the package is executed. The payload containing the transition BIOS and the payload containing the new BIOS can be individually authenticated, for example using a digital signature. Method 200 continues at block 202 where the new BIOS is stored at an Extensible Firmware Interface system partition (ESP). For example, during a reboot/initialization procedure at information handling system 100, flash memory device 170 can be updated to include the transition BIOS stored at a first payload of the firmware update package, and the new BIOS stored at a second payload of the update package can be stored at the ESP. An ESP is an EFI-compliant partition included at a hard drive or another storage medium that is reserved for use by an original equipment manufacturer. The ESP may store an EFI boot loader, applications used by the firmware during startup, diagnostic routines, system logs, and the like.

Method 200 continues at block 203 where the new BIOS is retrieved from the ESP and a firmware image at a BIOS flash device at the information handling system is updated using the new BIOS retrieved from the ESP. For example, after the transition BIOS has been installed at flash memory device 170, a reboot of information handling system 100 can be initiated. During execution of the transition BIOS, the new BIOS is retrieved from the ESP and stored at flash memory device 170. Information handling system 100 can then be rebooted using the new BIOS image, and only then is control of system 100 transferred to an operating system, for example Windows.

Figure 3:
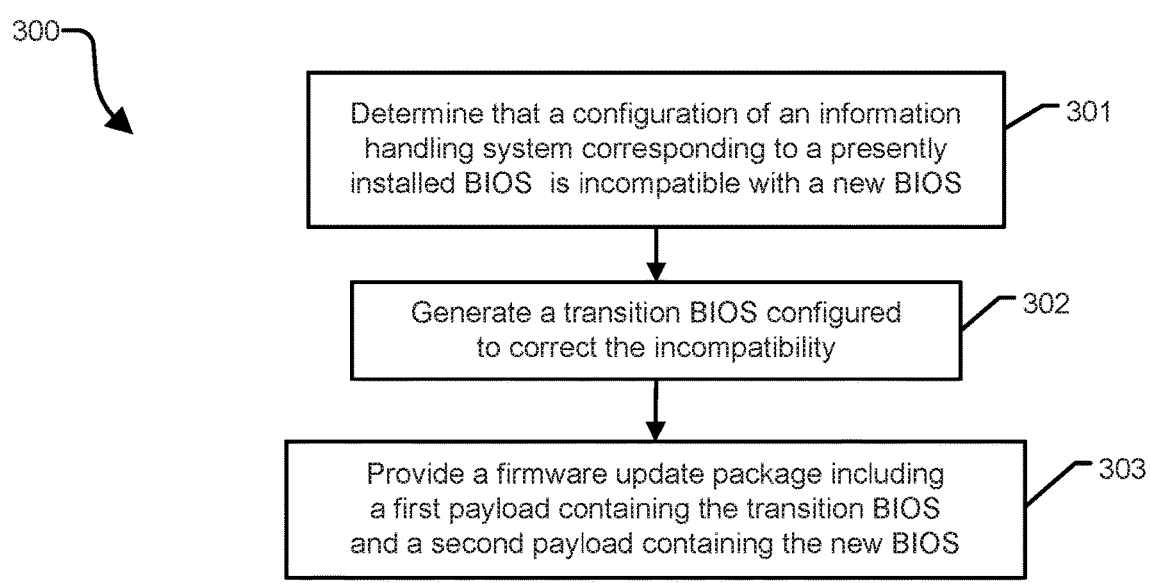
FIG. 3 is a flow diagram illustrating a method for generating a BIOS update package according to a specific embodiment of the present disclosure.

FIG. 3 is a flow diagram illustrating a method 300 for generating a BIOS update package according to a specific embodiment of the present disclosure. Method 300 begins at block 301 where it is determined that a configuration of an information handling system corresponding to a presently installed BIOS is incompatible with a new BIOS. For example, an original equipment manufacturer may identify a need to update firmware at information handling system 100, but determine that the new BIOS can not be installed without first correcting one or more incompatibilities. At block 302, a transition BIOS that is configured to correct these incompatibilities is generated. Method 300 completes at block 303 where a firmware update package including a first payload containing the transition BIOS and a second payload containing the new BIOS is generated. The update package can be provided to a Windows Update server for propagation to information handling system 100, or the update package can be provided to system 100 by other means, such as using a runtime executable downloaded from a network resource.

Figure 4:
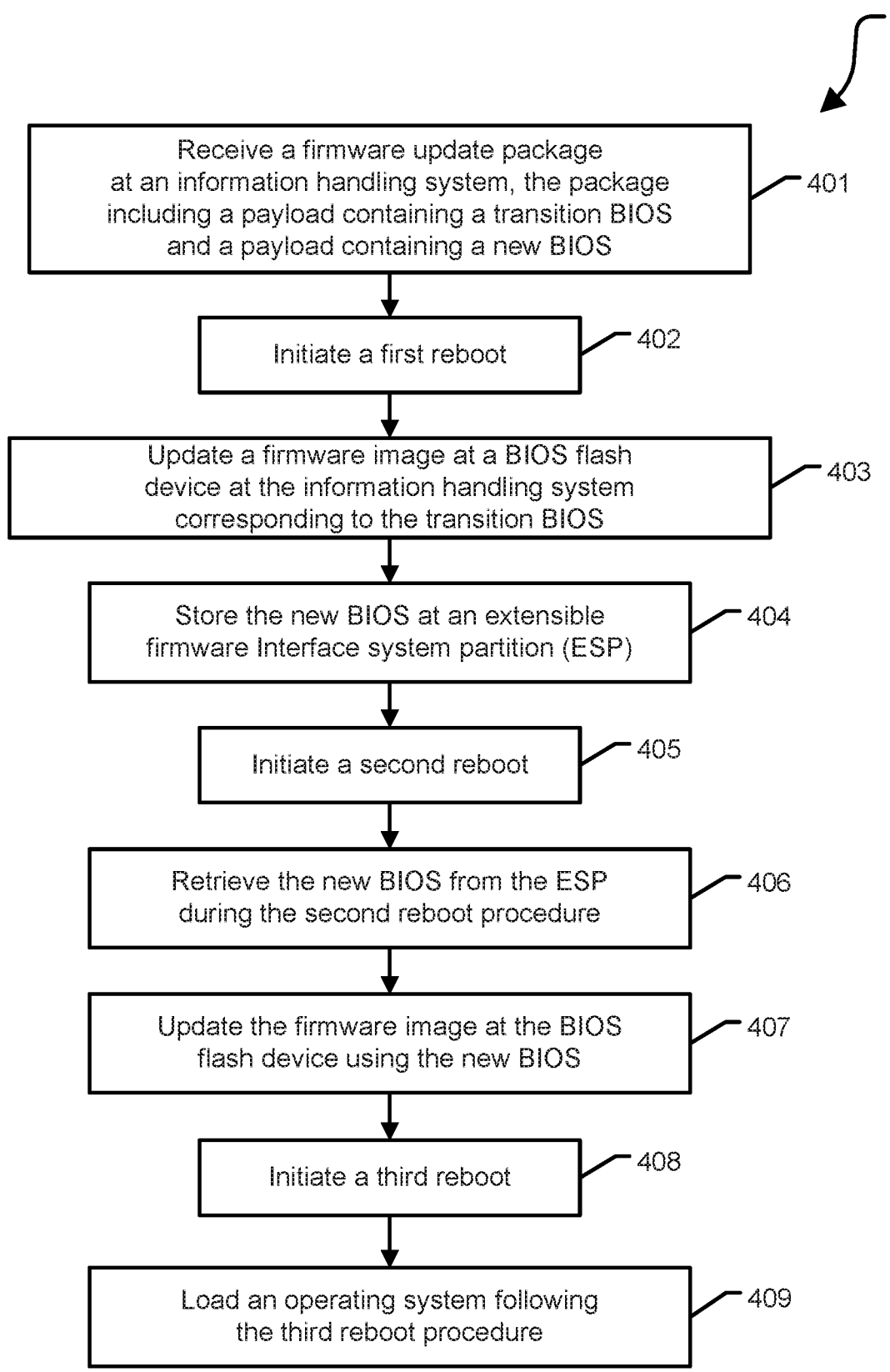
FIG. 4 is a flow diagram illustrating a method for installing transition firmware while updating a BIOS at an information handling system according to a specific embodiment of the present disclosure.

FIG. 4 is a flow diagram illustrating a method 400 for installing transition firmware while updating a BIOS at an information handling system according to a specific embodiment of the present disclosure. Method 400 begins at block 401 where a firmware update package is received at an information handling system, the package including a payload containing a transition BIOS and a payload containing a new BIOS. At block 402, a reboot of the information handling system is initiated. At block 403, a firmware image at a BIOS flash device at the information handling system is updated based on the transition BIOS. At block 404, the new BIOS is stored at an ESP included at a data storage device included at the information handling system. At block 405, a second reboot of the information handling system is initiated. At this time, the transition BIOS is executed during this reboot procedure. During execution of the transition BIOS, incompatibilities that prevented a direct migration to the new BIOS are corrected. At block 406, the new BIOS is retrieved from the ESP, and at block 407, the firmware image at the BIOS flash device is updated using the retrieved BIOS. At block 408, the system is once again rebooted. At this time, the new BIOS is executed during this reboot procedure. At block 409, the third reboot operation completes by loading an operating system. This is the first time during method 400 that the operating system has been loaded during the process of method 400.

Figure 5:
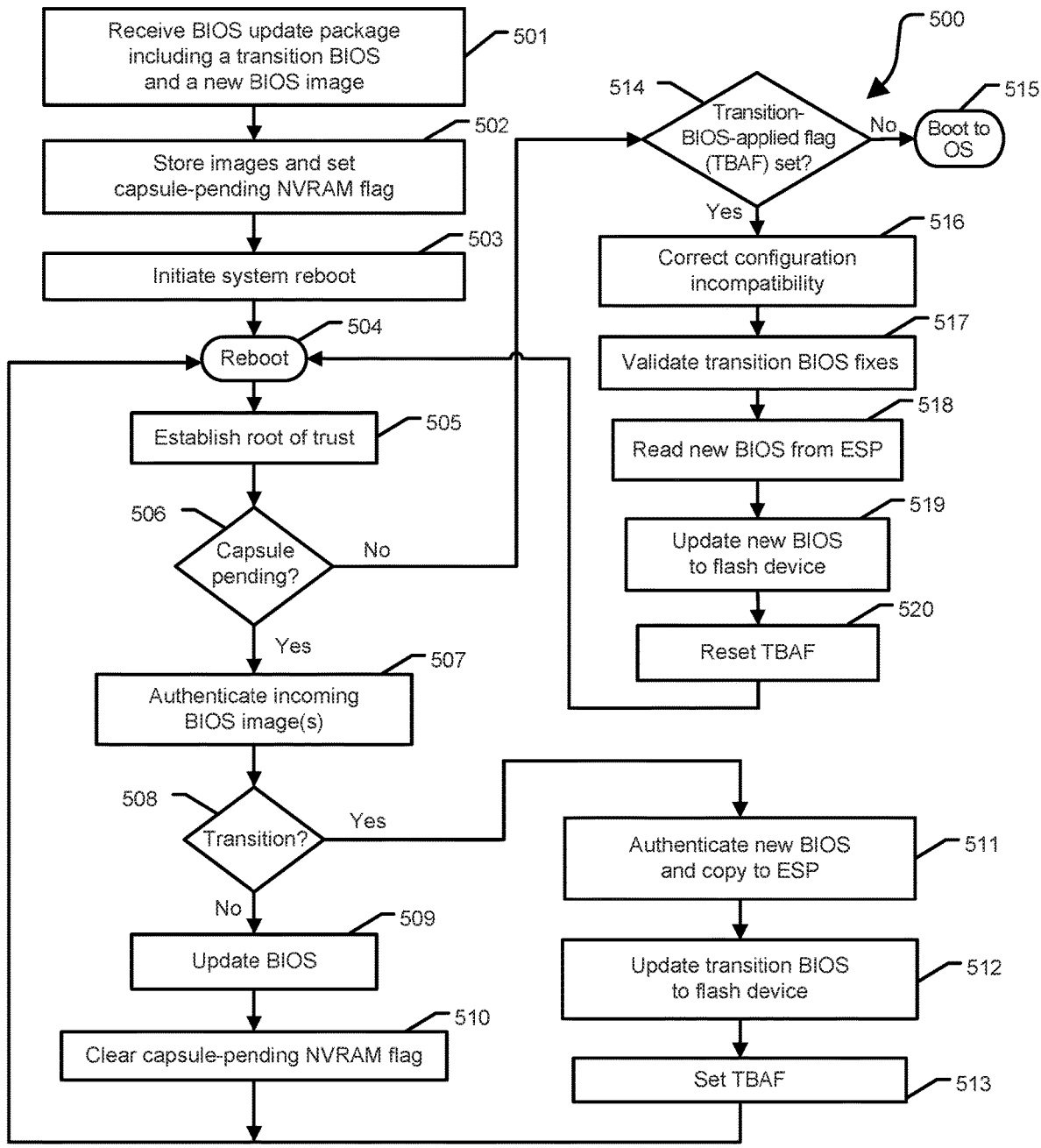
FIG. 5 is a flow diagram illustrating a method for updating a BIOS at an information handling system according to another embodiment of the present disclosure.

FIG. 5 is a flow diagram illustrating a method 500 for updating a BIOS at an information handling system according to another embodiment of the present disclosure. Method 500 illustrates the use of variables/flags to control operations performed during a boot sequence. In particular, a boot sequence can be configured to: 1) initialize the information system using the current BIOS stored at flash device 170 and launch an operating system; 2) update BIOS flash device 170 with a new BIOS image; 3) update the BIOS flash device with a transition BIOS; and 4) update flash device with a new BIOS image after first committing the transition BIOS to flash device 170. Method 500 begins at block 501 where a BIOS update package is received that includes one payload containing a transition BIOS and a second payload containing a new BIOS. At block 502 the two BIOS images are stored at the information handling system, for example at system memory 104 or at hard drive 124. A capsule-pending flag is set to indicate that the update package has delivered the new BIOS images.

At block 503, a reboot procedure is initiated at the information handling system, as identified by block 504. At block 505, a root of trust is established corresponding to the current BIOS installed at flash memory device 170. At decision block 506, a state of the capsule-pending flag is evaluated. If the capsule-pending flag indicates that an updated BIOS image is pending, method 500 proceeds to block 507 where the transition BIOS image and the new BIOS image are authenticated. At decision block 508, the boot sequence determines whether the update package includes a transition BIOS. In a particular embodiment, the decision is based upon a transition BIOS flag. For example, the transition BIOS flag can be set by an OS flash update utility, along with a capsule pending NVRAM flag, or the system BIOS can automatically decode the image (just after block 505), and the BIOS can set the transition BIOS flag if a transition BIOS is found. If the update package had included only a new BIOS image, the method proceeds directly to block 509 where flash device 170 is updated with the new BIOS image and the system is rebooted using the new image, and, at block 510, the capsule-pending flag is cleared. If however, at decision block 508, the update package includes a transition BIOS, method 500 proceeds to blocks 511-513 where the transition BIOS is installed at flash device 170. In particular, the new BIOS is authenticated and copied to the ESP at block 511, the transition BIOS is committed to flash device 170 at block 512, a transition-BIOS-applied flag (TBAF) is set at block 513, a reboot of system 100 is initiated, and method 500 returns to block 504. As before, a root of trust is establish at block 505, this time the root of trust is based on the transition BIOS that is now stored at flash device 170.

At decision block 506, method 500 proceeds to decision block 514 because the capsule-pending flag was previously cleared at block 507. At decision block 514, the boot sequence determines whether the TBAF is set. If the TBAF is not set, method 500 completes at block 515 where an operating system is installed. In the present scenario however the TBAF is set, having been set after updating the transition BIOS at block 513. Accordingly, method 500 proceeds to block 516 where configuration parameters that are incompatible with the new BIOS are adjusted. At block 517 it is determined whether the incompatibility issues that justified the need for a transition BIOS have been successfully remedied. At block 518, the new BIOS that was previous stored at the ESP (at block 511, above) is retrieved from the ESP. At block 519, flash device 170 is updated with the new BIOS. At block 520 the TBAF is cleared, and a reboot of system 100 is initiated (block 504). As before, a root of trust is established at block 505, this time the root of trust is based on the new BIOS. In the present scenario, the capsule-pending flag is not set and the TBAF is not set, so method 500 completes at block 515 where the operating system is loaded.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
  receiving a firmware update package at an information handling system, the package including a first payload containing a transition basic input-output system (BIOS) and a second payload containing a new BIOS;
  storing the new BIOS at an Extensible Firmware Interface system partition (ESP);
  retrieving the new BIOS from the ESP;
  updating the firmware image at the BIOS flash device using the transition BIOS; and
  updating a firmware image at a BIOS flash device at the information handling system using the new BIOS retrieved from the ESP.

2. The method of claim 1, wherein an operating system is not loaded at the information handling system between the updating using the transition BIOS and the updating using the new BIOS.

3. The method of claim 1, wherein the updating to the transition BIOS prior to the new BIOS is required to configure the information handling system for correct operation using the new BIOS.

4. The method of claim 1, wherein a platform root-of-trust is maintained throughout the duration of updating the firmware image with the transition BIOS and the new BIOS.

5. The method of claim 1, wherein no user action is required between updating of the firmware image with the transition BIOS and the updating of the firmware image with the new BIOS.

6. The method of claim 1, further comprising receiving the firmware update package from a Windows Update server.

7. The method of claim 1, wherein the first payload and the second payload are individually authenticated using corresponding digital signatures.

8. The method of claim 1, wherein the ESP is included at a hard drive at the information handling system.

9. A method comprising:
  determining that a configuration of an information handling system corresponding to a presently installed basic input-output system (BIOS) is incompatible with a new BIOS;
  generating a transition BIOS configured to correct the incompatibility; and
  providing a firmware update package including a first payload containing the transition BIOS and a second payload containing the new BIOS,
  wherein the firmware update package, when executed at the information system, is configured to:
    update a firmware image at a BIOS flash device at the information handling system based on the transition BIOS;
    store the new BIOS at an Extensible Firmware Interface system partition (ESP) at the information handling system; and
    update the firmware image at the BIOS flash device using the new BIOS retrieved from the ESP.

10. The method of claim 9, wherein an operating system is not loaded at the information handling system between the updating using the transition BIOS and the updating using the new BIOS.

11. The method of claim 9, wherein a platform root-of-trust is maintained throughout the duration of updating the firmware image with the transition BIOS and the new BIOS.

12. The method of claim 9, wherein no user action is required between updating of the firmware image with the transition BIOS and the updating of the firmware image with the new BIOS.

13. The method of claim 9, further comprising storing the firmware update package at a Windows Update server for deployment to the information handling system.

14. The method of claim 9, wherein the first payload and the second payload are individually authenticated using corresponding digital signatures.

15. An information handling system comprising:
  one or more processors; and
  one or more memory devices to store instructions executable by the one or more processors to:
    receive a firmware update package at an information handling system, the package including a first payload containing a transition basic input-output system (BIOS) and a second payload containing a new BIOS;
    initiate a first reboot procedure at the information handling system;
    update a firmware image at a BIOS flash device at the information handling system corresponding to the transition BIOS;
    store the new BIOS at an Extensible Firmware Interface system partition (ESP);
    initiate a second reboot procedure at the information handling system;
    retrieve the new BIOS from the ESP during the second reboot procedure;
    update the firmware image at the BIOS flash device using the new BIOS;
    initiate a third reboot procedure at the information handling system; and
    load an operating system following the third reboot procedure.

16. The information handling system of claim 15, wherein an operating system is not loaded at the information handling system between the updating using the transition BIOS and the updating using the new BIOS.

17. The information handling system of claim 15, wherein the updating to the transition BIOS prior to the new BIOS is required to configure the information handling system for correct operation using the new BIOS.

18. The information handling system of claim 15, wherein a platform root-of-trust is maintained throughout the duration of updating the firmware image with the transition BIOS and the new BIOS.

19. The information handling system of claim 15, wherein no user action is required between updating of the firmware image with the transition BIOS and the updating of the firmware image with the new BIOS.

* * * * *